(12) United States Patent
Ku et al.

(10) Patent No.: US 7,148,418 B2
(45) Date of Patent: Dec. 12, 2006

(54) ELECTRONIC DEVICE AND HOLDER HAVING ELASTIC ELEMENTS THEREOF

(75) Inventors: Hung Chung Ku, Taipei (TW); Pin An Hsieh, Banciao (TW)

(73) Assignee: ASUSTeK Computer Inc., Taipei (TW)

( * ) Notice: Subject to any disclaimer, the term of this patent is extended or adjusted under 35 U.S.C. 154(b) by 289 days.

(21) Appl. No.: 10/963,736

(22) Filed: Oct. 14, 2004

(65) Prior Publication Data

US 2005/0211459 A1  Sep. 29, 2005

(30) Foreign Application Priority Data

Mar. 25, 2004  (TW) .............................. 93108206 A

(51) Int. Cl.
*H05K 9/00* (2006.01)
*H05K 5/00* (2006.01)

(52) U.S. Cl. .................. 174/52.1; 361/752; 361/800

(58) Field of Classification Search ............... 174/52.1, 174/52.4; 361/683, 684, 685, 686, 724, 728, 361/752, 753, 799, 800, 807
See application file for complete search history.

(56) References Cited

U.S. PATENT DOCUMENTS

| | | | | |
|---|---|---|---|---|
| 5,047,898 A | * | 9/1991 | Cooke et al. ............... 361/685 |
| 5,564,804 A | * | 10/1996 | Gonzalez et al. ......... 312/223.2 |
| 5,673,171 A | * | 9/1997 | Varghese et al. ............ 361/685 |
| 5,726,864 A | * | 3/1998 | Copeland et al. ........... 361/800 |
| 5,734,557 A | * | 3/1998 | McAnally et al. .......... 361/727 |
| 6,661,677 B1 | * | 12/2003 | Rumney ..................... 361/818 |

FOREIGN PATENT DOCUMENTS

TW   486110   6/1990

* cited by examiner

Primary Examiner—Dean A. Reichard
Assistant Examiner—Carmelo Oliva
(74) Attorney, Agent, or Firm—Birch, Stewart, Kolasch & Birch, LLP

(57) ABSTRACT

A holder located on a casing using for loading a hard disk includes a bottom surface, at least a first elastic element and at least a second elastic element. The bottom surface is facing to a first surface of the casing. The first elastic element is located on the bottom surface having a first end connected to the bottom. At least a part of the first elastic element is configured through an opening and clipped on a second surface of the case. There is at least an opening configured through the first surface and the second surface. The second surface is in opposition to the first surface. A third end of the second elastic element is connected to the bottom surface, and at least a part of the second elastic element contacts against the first surface.

20 Claims, 5 Drawing Sheets

ELECTRONIC DEVICE AND HOLDER HAVING ELASTIC ELEMENTS THEREOF

This Non-provisional application claims priority under 35 U.S.C. § 119(a) on Patent Application No(s). 093108206 filed in Taiwan, Republic of China on Mar. 25, 2004, the entire contents of which are hereby incorporated by reference.

BACKGROUND OF THE INVENTION

1. Field of Invention

The invention relates to a holder and, in particular, to a holder having an elastic element in contact with a casing.

2. Related Art

With progress in the electronic technology, people have higher dependence on various kinds of electronic devices. In particular, the convenience and portability of laptop computers has induced a lot of demands in recent years. However, during the moving process, there may be collisions occurring to the laptop computer. The operation of the hard disk drive (HDD) itself also causes vibrations that may damage the computer.

As shown in FIG. 1, to avoid damages to the HDD 6, the holder 1 of the conventional HDD 6 is installed on a buffer pad 2 that is installed on a casing 3. The buffer pad 2 can absorb the intrinsic vibration of the HDD 6 and also external collisions to reduce the chances of damages to the HDD 6. The buffer pad 2 can be a rubber, a conductive cloth, or a conductive sponge. If the buffer pad 2 is a conductive cloth or a conductive sponge, a first surface and a second surface of the casing 3 have a conductive film (not shown). In addition to the buffering function, it can further reduce the electromagnetic interference (EMI) on the HDD 6.

Thus, it is an important subjective in the field to provide a holder that can both provide a buffer for vibrations and collisions and effectively reduce the EMI on the HDD.

SUMMARY OF THE INVENTION

In view of the foregoing, the invention is to provide a holder to both buffer vibrations and collisions and effectively reduce the EMI effect on the HDD.

To achieve the above, the holder of the invention is installed on a casing to load an HDD. The holder comprises a bottom surface, at least one first elastic element and at least one second elastic element. The bottom surface is facing to a first surface of the casing. The first elastic element is installed on the bottom surface with a first end connected to the bottom surface. At least one part of the first elastic element is configured through at least one opening of the casing, and clips on a second surface of the casing. The opening is configured through the first surface and the second surface, the latter being opposite to the former. A third end of the second elastic element is connected to the bottom surface. At least one part of the second elastic element is in contact with the first surface.

Since the holder of the invention includes a bottom surface, at least one first elastic element and at least one second elastic element, any vibration or collision occurred to the HDD can be buffered to reduce possible damages. It can also effectively reduce the EMI effects on the HDD.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
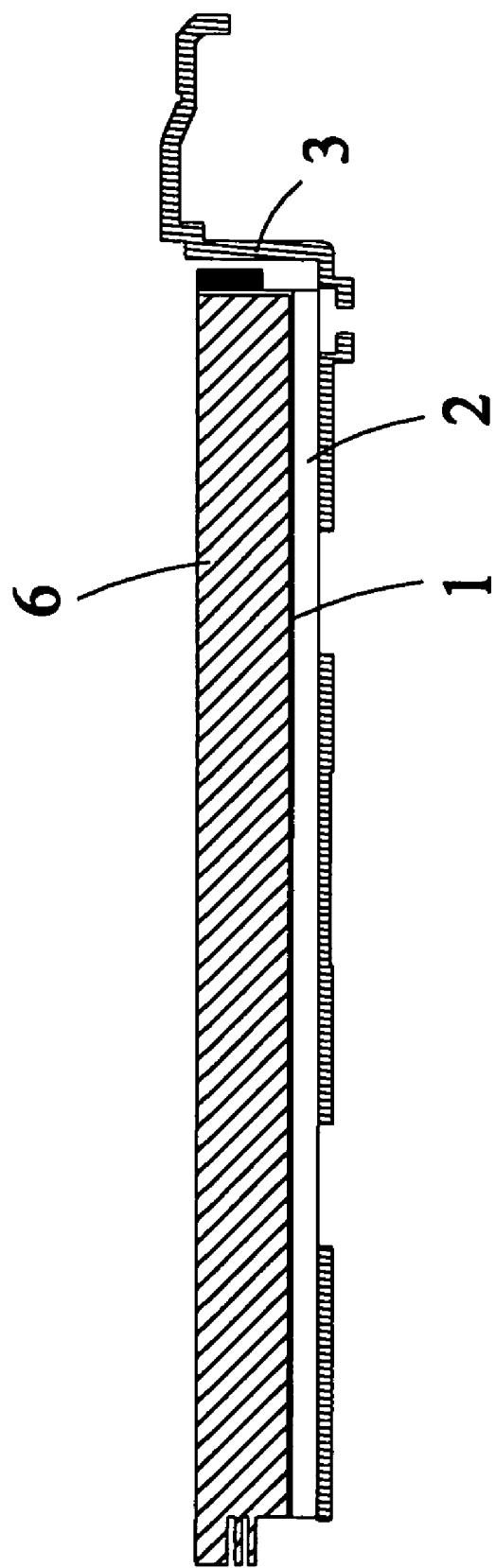
FIG. 1 is a schematic view of a conventional holder.
Figure 2:
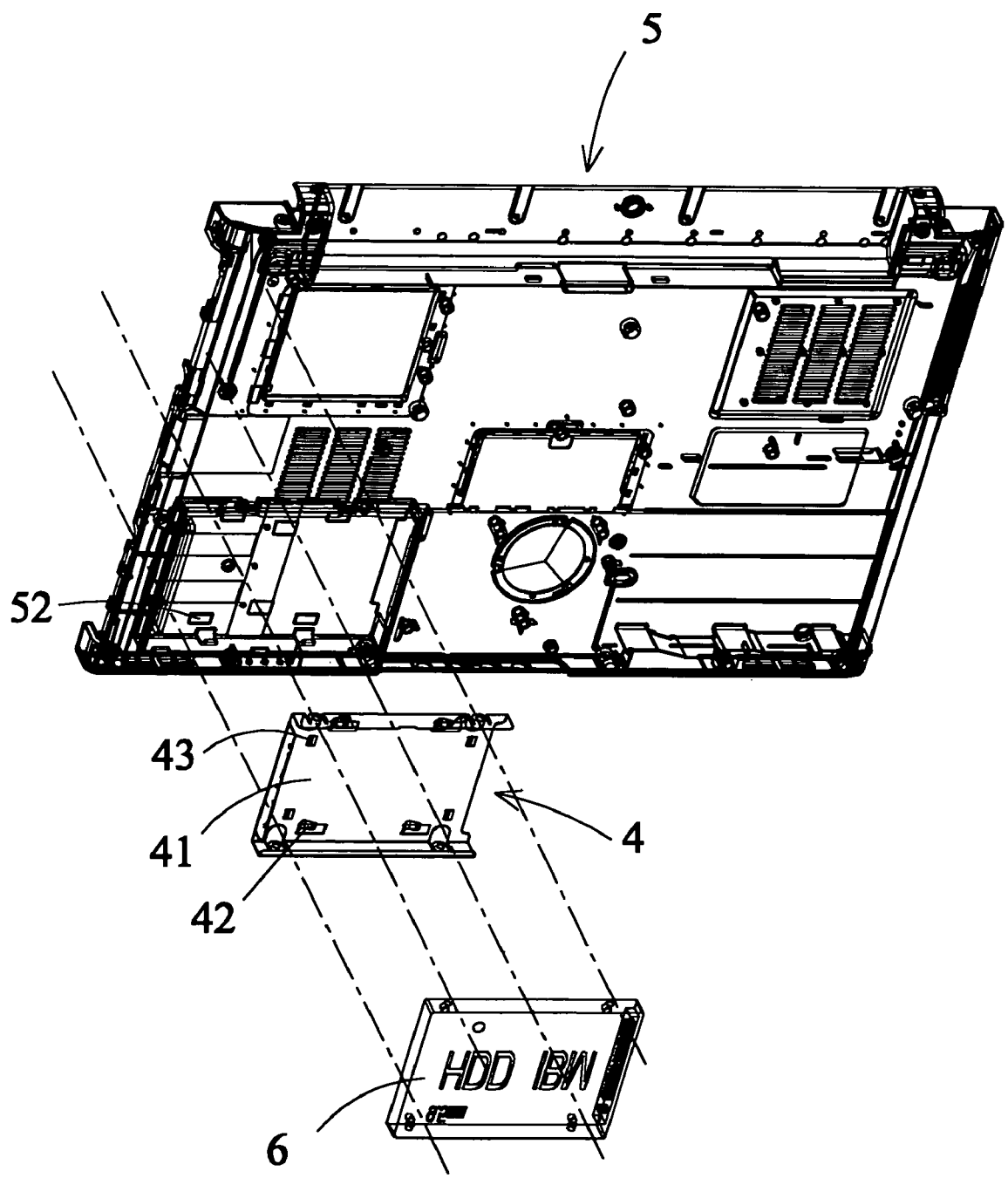
FIG. 2 is a schematic view of how the holder functions according to a preferred embodiment of the invention.
Figure 3:
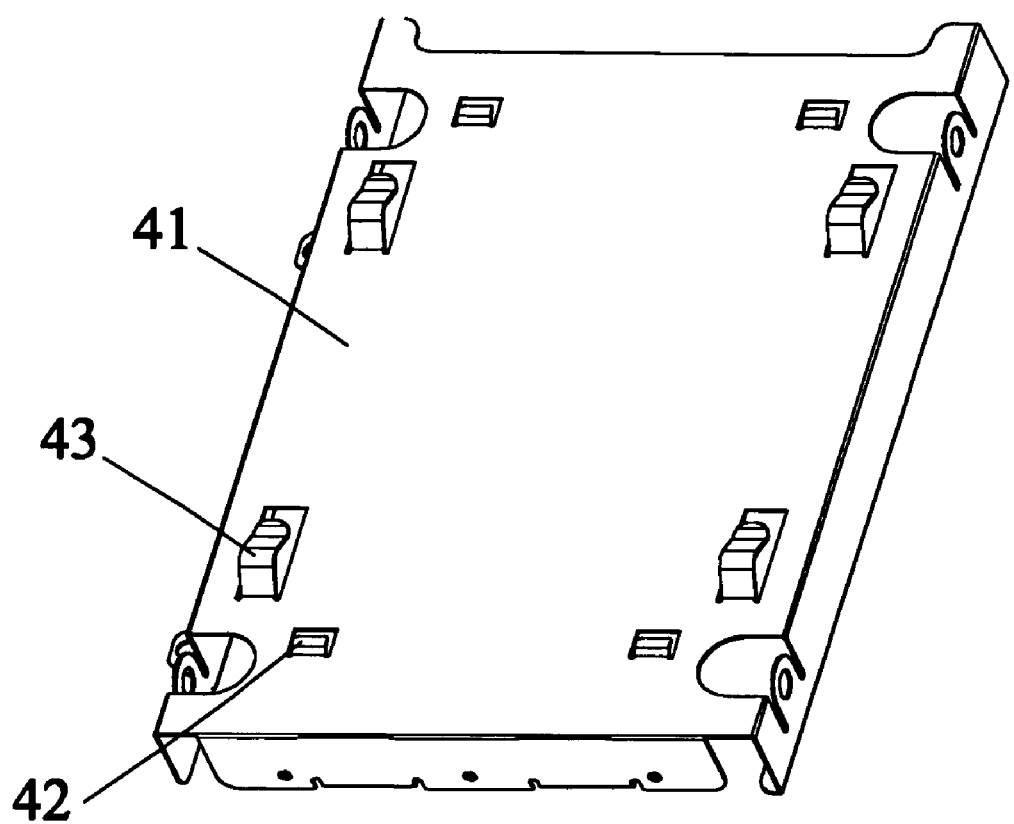
FIG. 3 is a schematic exploded view of the holder according to the preferred embodiment of the invention.

As shown in FIGS. 2 and 3, the holder 4 according to an embodiment of the invention is installed on a casing 5 to support an object to be protected. In this embodiment, the object to be protected is an HDD 6. The holder 4 includes a bottom surface 41, at least one first elastic element 42 and at least one second elastic element 43. The bottom surface 41 is facing to a first surface 51 of the casing 5.

Figure 4:
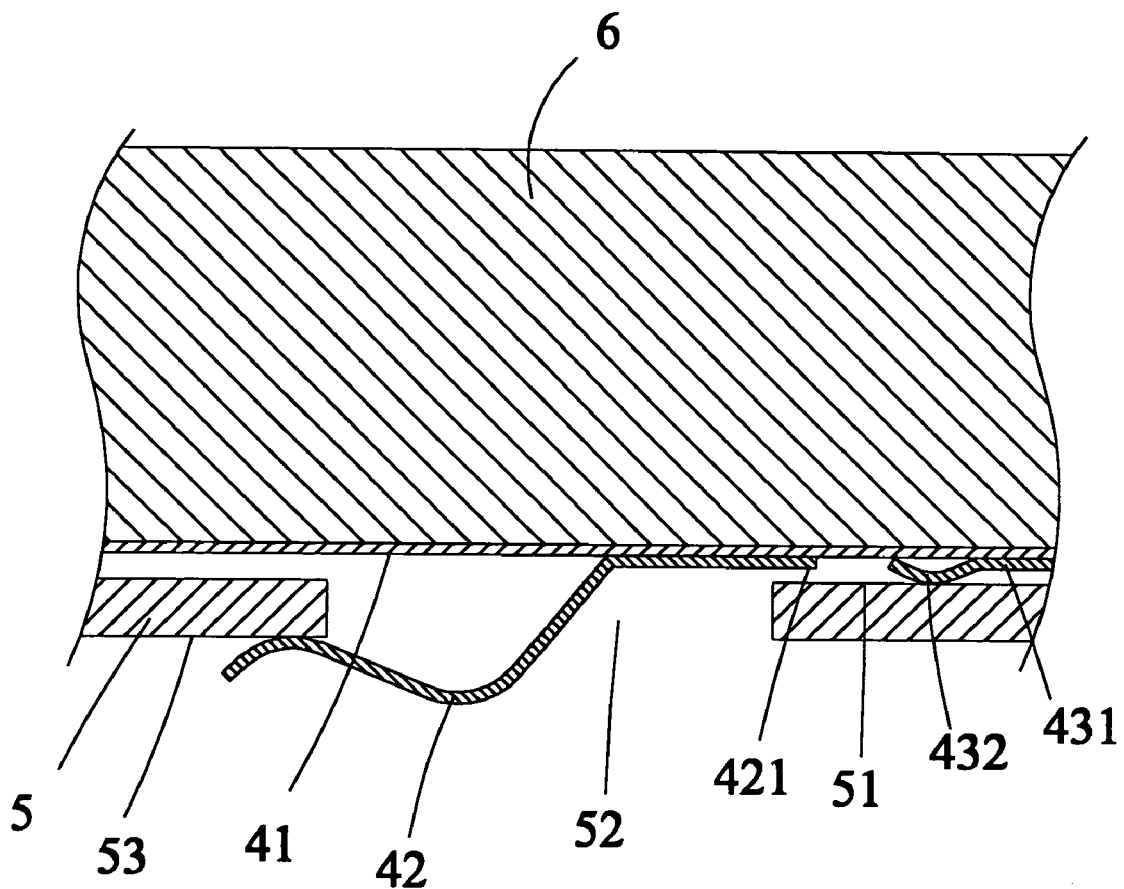
FIG. 4 is a partially enlarged schematic view of the holder according to the preferred embodiment of the invention.
Figure 5A:
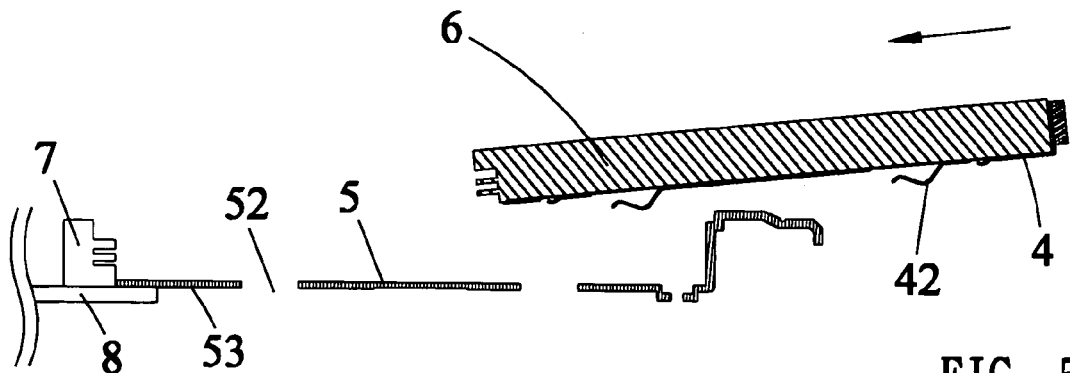
FIGS. 5A to 5E are schematic views showing the installation procedure of the holder according to the preferred embodiment of the invention.
Figure 5B:
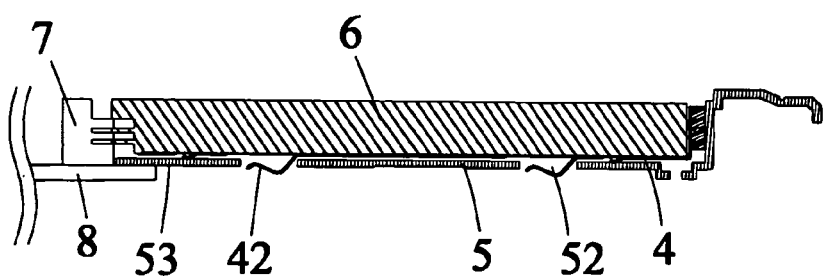
Figure 5C:
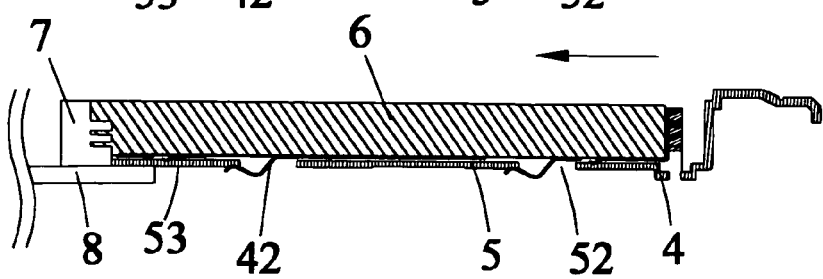
Figure 5D:
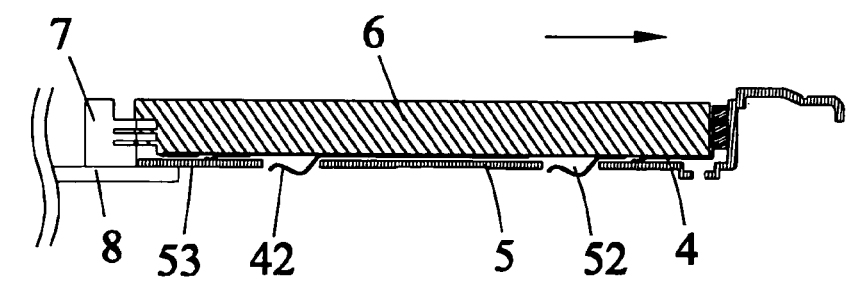
Figure 5E:
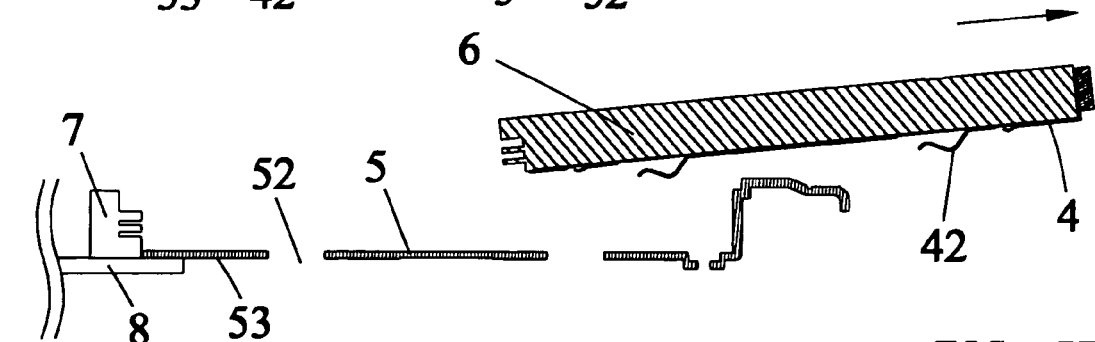

As shown in FIG. 4, the first elastic element 42 is installed on the bottom surface 41. A first end 421 of the first elastic element 42 is connected to the bottom surface 41. At least one part of the elastic element 42 is configured through at least one opening 52 of the casing 5, and clips a second surface 53 of the casing 5. The opening 52 is configured through a first surface 51 and a second surface 53, with the latter being opposite to the former 51.

A third end 431 of the second elastic element 43 is connected to the bottom surface 41. At least one part of the second elastic element 43 is in contact with the first surface 51. A fourth end 432 of the second elastic element 43 touches against the first surface 51.

With reference to FIGS. 5A to 5E, when the holder 4 is installed on the casing 5, the holder 4 loaded with an HDD 6 is pushed into the casing 5 so that at least one part of the first elastic element 42 is configured through the opening 52. It is further pushed in the direction toward the connection port 7, so that the first elastic element 42 is connected to the casing 5 and clips onto the second surface 53. The connection port 7 is provided on a circuit board 8 to connect the HDD 6 to a circuit. When taking the holder 4 out, the holder 4 loaded with the HDD 6 is pushed away from the connection port 7. Then, the first elastic element 42 no longer clips on the second surface 53, before the holder 4 is completely pulled out.

Referring to FIG. 4, when the holder 4 is in a collision, the external force pushes the holder 4 away from the first surface 51. However, the second surface 53 prevents the first elastic element 42 from moving away from the casing 5. Thus, the first elastic element 42 provides a restoring force to balance at least partially the external force, reducing the impact on the holder 4 and the HDD 6 by the external force. Moreover, when the holder 4 is pushed by the external force toward the first surface 51, the first surface 51 prevents the second elastic element 43 from moving toward the casing 5. Therefore, the second elastic element 43 has a restoring force to balance at least partially the external force, reducing the impact on the holder 4 and the HDD 6 by the external force.

The first elastic element 42 can be formed together with the holder 4. The second elastic element 43 and the holder 4 can also be integrally formed.

Moreover, the first surface 51 and the second surface 53 have a conductive film. The holder 4, the first elastic element 42 and the second elastic element 43 are made of a conductive material. The first end 421 of the first elastic element 42 is connected to the bottom surface 41 and at least partially configured through the opening 52 to clip the second surface 53. In addition, the third end 431 of the second elastic element 43 is connected to the bottom surface 41, and the fourth end 432 touches against the first surface 51. Therefore, the first elastic element 42 and the second elastic element 43 are in electrical connections with the first surface 51 and the second surface 53 that have the conductive film(s), thereby reducing the EMI on the HDD 6.

The following discloses an electronic device according to another embodiment of the invention, where the same references relate to the same elements in the previous embodiment.

An electronic device according to this embodiment of the invention comprises a casing 5, a holder 4, at least one first elastic element 42, and at least one second elastic element 43. The casing 5 has a first surface 51, a second surface 53, and at least an opening 52. The opening 52 is configured through the first surface 51 and the second surface 53. The second surface 53 is opposite to the first surface 51. The holder 4 is installed on the casing 5 to support a HDD 6, and has a bottom surface 41 facing to the first surface 51. The first elastic element 42 is installed on the bottom surface 41, with a first end 421 connected to the bottom surface 41. At least one part of the first elastic element 42 is configured through the opening 52, and clips onto the second surface 53. A third end 431 of the second elastic element 43 is connected to the bottom surface 41. At least one part of the second elastic element 43 is in touch with the first surface 51. Since the structures, configurations and functions of the holder 4, the first elastic element 42, and the second elastic element 43 in the current embodiment are the same to those described in the previous embodiment, the descriptions thereof are omitted herein in concise purpose. Nevertheless, as described before, the first end 421 of the first elastic element 42 is connected to the bottom surface 41 and one part thereof clips onto the second surface 53. The third end 431 and the fourth end 432 of the second elastic element 43 are connected to the bottom surface 41 and the first surface 51. Therefore, the vibrations of the HDD itself and any collision can be absorbed to reduce the damages. As the first elastic element 42 and the second elastic element 43 are both made of a conductive material, and the first surface 51 and the second surface 53 of the casing are formed with a conductive film, EMI can be effectively blocked from the HDD.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A holder installed in a casing to support an object to be protected, the holder comprising:

a bottom surface, which is facing to a first surface of the casing;

at least one first elastic element, which is installed on the bottom surface, wherein a first end of the first elastic element connects to the bottom surface, at least one part of the first elastic element is configured through at least one opening of the casing and clips onto a second surface of the casing, and the opening is configured through the first surface and the second surface opposite to the first surface; and at least one second elastic element, wherein a third end of the second elastic element is connected to the bottom surface and at least one part of the second elastic element is in contact with the first surface.

2. The holder of claim 1, wherein when the holder is pushed by an external force away from the first surface, the second surface prevents the first elastic element from leaving the casing, and the first elastic element obtains a restoring force to balance at least partially the external force so as to reduce the impact caused by the external force on the holder and the object.

3. The holder of claim 1, wherein when the holder is pushed by an external force toward the first surface, the first surface prevents the second elastic element from moving toward the casing, and the second elastic element obtains a restoring force to balance at least partially the external force so as to reduce the impact caused by the external force on the holder and the object.

4. The holder of claim 1, wherein a fourth end of the second elastic element touches against the first surface.

5. The holder of claim 1, wherein the first elastic element and the holder are integrally formed.

6. The holder of claim 1, wherein the second elastic element and the holder are integrally formed.

7. The holder of claim 1, wherein one of the first surface and the second surface has a conductive film.

8. The holder of claim 1, wherein the holder and the first elastic element are made of a conductive material.

9. The holder of claim 1, wherein the holder and the second elastic element are made of a conductive material.

10. The holder of claim 1, wherein the object to be protected is a hard disk drive (HDD).

11. An electronic device, comprising:

a casing, which has a first surface, a second surface, and at least an opening, wherein the opening is configured through the first surface and the second surface, and the second surface is opposite to the first surface;

a holder, which is installed on the casing to support an object to be protected and has a bottom surface, wherein the bottom surface is facing to the first surface;

at least one first elastic element, which is installed on the bottom surface, wherein a first end of the first elastic element connects to the bottom surface, and at least one part of the first elastic element is configured through the opening and clips onto the second surface; and at least one second elastic element, wherein a third end of the second elastic element is connected to the bottom surface and at least one part of the second elastic element is in contact with the first surface.

12. The electronic device of claim 11, wherein when the holder is pushed by an external force away from the first surface, the second surface prevents the first elastic element from leaving the casing, and the first elastic element obtains a restoring force to balance at least partially the external force so as to reduce the impact caused by the external force on the holder and the object.

13. The electronic device of claim 11, wherein when the holder is pushed by an external force toward the first surface, the first surface prevents the second elastic element from moving toward the casing, and the second elastic element obtains a restoring force to balance at least partially the external force so as to reduce the impact caused by the external force on the holder and the object.

14. The electronic device of claim 11, wherein a fourth end of the second elastic element touches against the first surface.

15. The electronic device of claim 11, wherein the first elastic element and the holder are integrally formed.

16. The electronic device of claim 11, wherein the second elastic element and the holder are integrally formed.

17. The electronic device of claim 11, wherein one of the first surface and the second surface has a conductive film.

18. The electronic device of claim 11, wherein the holder and the first elastic element are made of a conductive material.

19. The electronic device of claim 11, wherein the holder and the second elastic element are made of a conductive material.

20. The electronic device of claim 11, wherein the object to be protected is a hard disk drive (HDD).

* * * * *